Patented Feb. 29, 1944

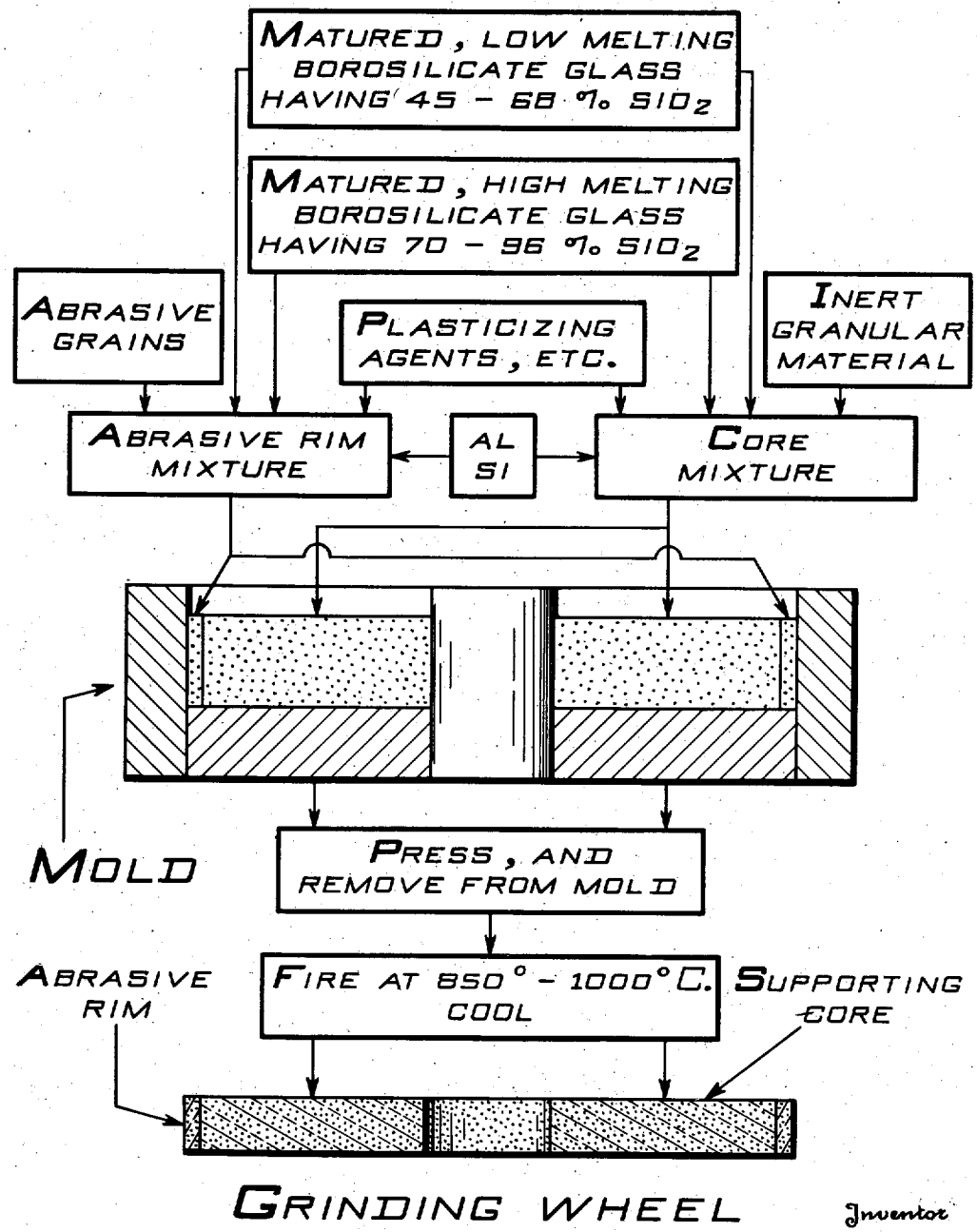

2,343,218

UNITED STATES PATENT OFFICE 2,343,218

ABRASIVE ARTICLE AND METHOD OF MAKING THE SAME

Robert H. Lombard, Worcester, Mass., assignor to Norton Company, Worcester, Mass., a corporation of Massachusetts Application January 22, 1942, Serial No. 427,753

12 Claims. (Cl. 51—307)

This invention relates to abrasive articles and methods of making the same, and more particularly to the production of grinding wheels made of abrasive grains bonded by vitrified inorganic materials. It is especially adapted for the manufacture of vitrified bonded diamond abrasive wheels and articles, but it applies more broadly to making abrasive bodies of the other abrasive materials and particularly the readily oxidized boron carbide and silicon carbide.

A diamond grinding wheel may be formed of an inner supporting core of vitrified bonded pulverulent material carrying integral therewith an outer annulus or a rim having diamond grains bonded by a vitrified material. A wheel made of vitrified bonded diamond grains should have a strong wheel structure capable of giving economical service, and one which can be made under conditions which do not impair the abrasive qualities of the grains and which will withstand the thermal and physical shocks of manufacture and use. This type of wheel has a high bond content and may require as high as 50 to 60% or more by volume of vitrified bond in the abrasive rim, and that rim should be rigidly and strongly united to the supporting core. Also, it is desirable that a wheel containing the easily oxidized diamond grains be fired at a temperature of not over 1000° C. and in a non-oxidizing atmosphere. A mixture of siliceous and other inorganic materials capable of being fused or softened to a vitrified bond at that low temperature requires an initial high content of a glassy and low melting phase, yet the use of a large proportion of a too fluid glass causes undesirable shrinkage or slumping during the firing operation, with the possibility that either zone of the wheel may warp or crack, or the two zones may not be integrally or strongly united.

The linear coefficient of expansion of diamond appears not to be fully known, but it is relatively small and may be provisionally taken to be about $12 \times 10^{-7}$. The linear coefficient of expansion of silicon carbide is about $45 \times 10^{-7}$, and of crystalline alumina about $70 \times 10^{-7}$. If vitrified bonds which are best adapted for silicon carbide or crystalline alumina could be otherwise employed with diamond grains, that difference in expansion might result in crazing of the bond glass, and weak bonding. It is desirable that the coefficients of expansion of the bond and the grains be matched sufficiently to avoid such deleterious effects. It is also desirable that the expansivities of the abrasive rim and the central vitrified bonded support be sufficiently close so as to avoid undue strains at the junction therebetween under the conditions of manufacture and use.

As a further feature, the major source of the vitrified bond should be a prefired glass in which the reactions between the various constituents have been brought substantially to completion before the bonding ingredients are mixed with the abrasive grains and fired to form the wheel. That is, the preferred low firing temperature range of 850 to 1000° C. and the short firing periods which are best adapted for vitrified bonded diamond wheels may not permit raw clays and other inorganic materials to react sufficiently to attain the desired final vitreous properties; hence it is desirable that a large proportion of these ingredients be initially fired together at a high enough temperature to form a prefired glass of selected properties and that the bonding operation be essentially that of fusing the glass at a safe temperature, preferably in a non-oxidizing atmosphere, in the presence of the diamond grains. Since diamond is difficultly wettable, it is desirable to use a bond having a glassy phase of low viscosity when melted. Furthermore, the bond should be tough, not brittle, and not easily spalled, especially in a wheel of low porosity, such as 15% to 6% or less of pores, which structure thus has a very high bond content. The readily available glasses are not well adapted for bonding diamond grains and making satisisfactory wheels or other abrasive articles.

It is accordingly a primary object of this invention to provide an abrasive article in which the abrasive grains, especially diamonds, are vitrified bonded satisfactorily into a strong and useful structure. A further object of the invention is to provide a vitrified bond having a coefficent of expansion within a desired range and particularly one which is sufficiently close to that of diamond or other selected abrasive grains.

Another object of the invention is to provide a vitrified bond composition which will yield the desired fluidity for adhering strongly to the abrasive grains and yet which will not swell or become bloated or permit deleterious shrinkage or slumping of the fired article when used in high amounts or be otherwise detrimentally affected during the firing operation. A still further object of the invention is to provide a vitrified bond for abrasive grains which has the required properties and which matures to bond the grains within the temperature range of 850 to 1000° C.

Another object of the invention is to provide a vitrified bond having glassy phases derived principally from two or more prefired glasses of widely different properties which may be selected and combined in a variety of proportions in order that the required expansivity, fluidity, solubility, strength, adhesion and other properties of the bond may be obtained as desired. A further object of the invention is to provide a simple, easily controlled and variable method of making an abrasive article which comprises compounding and mixing two or more different glasses to form a major constituent of a bond of the required properties.

A further object of the invention is to provide a vitrified bond which is well adapted for making a bonded diamond abrasive article, and particularly a two zone grinding wheel having an abrasive annulus integral with a central supporting vitrified bonded core. Further objects will be apparent in the following disclosure.

In accordance with this invention, I propose to make a bond for abrasive grains having as its main source of a vitreous bonding phase a mixture of at least two prefired or substantially fully matured glasses having differing properties, and preferably as regards the expansivity, fusibility, initial softening point or other characteristics, so that bonds of selected properties may be made by combining various proportions of these glasses. These glasses, which comprise the oxides of silicon and boron, are borosilicate glasses of two main types. One is a glass having a high content of silicate or chemically combined silica, and preferably ranging, calculated as $SiO_2$, from 70% to 96% $SiO_2$ by weight; and the other is a glass having a lower silica content, preferably within the range, calculated as $SiO_2$, of 45% to 68% $SiO_2$ by weight. The high silica glass does not soften and flow sufficiently for good bonding ability at temperatures of about 1000° C. or below, under ordinary conditions. The glass of low silica content is a low-melting borosilicate glass which will insure the forming of a glassy bonding phase sufficiently fluid for a strong union. Each glass preferably has a low alkali content. The ingredients of the raw bond include as important constituents two or more of these different glasses and may also comprise refractory or other material intended to confer plasticity, to form the structural framework of the body, or to augment the glassy phase of the bond, as by being dissolved therein.

By suitably combining selected proportions of different glasses of these two types, I am able to make many types of vitrified bonds which will serve for producing abrasive bodies of widely different properties, and particularly two-zone wheels having an abrasive rim integral with a supporting core. The mixture from which the vitrified bond is derived is also so selected as to provide a core and a rim which will remain integrally united after the firing operation. In order to provide a bond of low coefficient of expansion approaching that of diamonds, I provide a high percentage of the acidic oxides $SiO_2$ and $B_2O_3$ and a low percentage of the oxides of the alkali and alkaline earth metals. The two types of glasses are preferably so constituted and proportioned in the wheel mixture that in their combination with other ingredients, they mature in two stages at a temperature of 850 to 1000° C. to provide a satisfactory vitrified bond for the easily oxidized diamond grains. The highly fluid low silica glass first melts in the first stage of firing and wets the grains. Then, in a second all or a part of the high silica glass of low fluidity stage, dissolves in the melt and imparts its properties to the bond. If some of the high silica glass remains undissolved, it functions usefully as another glassy phase contributing to the desired structure of the product. The glasses are also preferably so constituted that they have quite different thermal coefficients of expansion so that they may be compounded in desired proportions easily to provide bonds having a range of thermal expansivities. This facilitates the adapting of the expansivity of the bond glass to that of the abrasive.

While the bonding methods of this invention may be employed in the manufacture of simple types of one-zone grinding wheels, they are particularly adapted for making composite wheels. Composite wheels made according to the present invention may be so-called peripheral wheels, that is, consisting essentially of a disk the periphery of which does the grinding, the center part or core of the disk usually bounded by a circle being non-abrasive, and the annular periphery containing the abrasive grains. Or wheels according to this invention may be dish or cup-shaped wheels or so-called flaring cups, these types of wheels grinding on a side face which may be a plane perpendicular to the axis of the wheel or may be an internal or an external cone surface. In such dish, cup or flaring cup wheels, the supporting portion, sometimes called a center or back, is non-abrasive and a grinding portion which is an annular side face abrasive and according to this invention is prefe\ably integral with the center or back. It will be seen that a flaring cup wheel with an external conical abrasive surface finally merges into a disk peripheral wheel when the included conical angle reaches zero.

The accompanying drawing is a schematic view illustrating the main features of the invention and giving the principal steps and ingredients involved in making a two zone grinding wheel, the latter being shown as a diametric section.

As examples of the types of glass which satisfy my requirements for the difficultly fusible, high softening borosilicate glass of high silica content, I prefer to use those compositions which contain the following proportions of ingredients, as is set forth in Table I, wherein the "alkaline" oxides are the oxides of the alkali metals and the alkaline earth metals. The reference to silica or other oxides of metals in the glasses and the analyses given herein follow standard chemical practice in the ceramic industry of specifying chemical compositions by analyses calculated as oxides. The chemical or physical structure of the glasses or the exact chemical compounds present therein are not defined by such analyses, and no attempt is made by the analyses to describe the structure or compounds. Hence the claims are to be interpreted accordingly.

TABLE I

*High silica glass, essential constituents*

| | Percent by weight |
|---|---|
| $SiO_2$ | 70 to 96 |
| $B_2O_3$ | 29.5 to 3.5 |
| "Alkaline" oxides | 0.5 to 6.5 |

The coefficients of linear expansion of these glasses are low and range chiefly below $40 \times 10^{-7}$.

Specific examples of such bond glasses are found in Table II, which gives the percentages by weight.

TABLE II

*High silica borosilicate glasses*

| | | Glass A | Glass B |
|---|---|---|---|
| $SiO_2$ | per cent | 80.75 | 94.5 |
| $B_2O_3$ | do | 12.00 | 5.0 |
| $Na_2O$ | do | 4.10 | 0.5 |
| $K_2O$ | do | 0.10 | |
| $CaO$ | do | 0.30 | |
| $Al_2O_3$ | do | } 2.20 | |
| $Fe_2O_3$ | do | | |
| $As_2O_3$ | do | 0.40 | |
| Coefficient of linear expansion | ° C | $32 \times 10^{-7}$ | $8 \times 10^{-7}$ |

The borosilicate glasses or frits of low silica content and low alkali content which may be suitably combined with the glasses of the above tables to form a main source of the vitrified bond should usually contain the ingredients in the proportion ranges given in percentages by weight in Table III.

TABLE III

*Low silica borosilicate frits, constituents*

| | Percent |
|---|---|
| $SiO_2$ | 45 to 68 |
| $B_2O_3$ | 20 to 40 |
| "Alkaline" oxides | 3 to 10 |

As specific examples of preferred frits capable of use with the high silica glasses of Tables I and II, the following may be used in the approximate compositions set forth in Table IV.

TABLE IV

| | | Low silica glasses | |
|---|---|---|---|
| | | C | D |
| $SiO_2$ | per cent by weight | 52.5 | 65.09 |
| $B_2O_3$ | do | 36.3 | 21.9 |
| $Al_2O_3$ | do | 0.9 | 8.20 |
| CaO | do | 3.0 | 0.23 |
| MgO | do | | 0.20 |
| $Na_2O$ | do | 7.3 | 4.38 |
| Softening temperature for vitrified bonding | °C | Below 1,000 | Below 1,000 |

The coefficient of linear expansion of the frit glasses of Table III ranges from about $40 \times 10^{-7}$ to $50 \times 10^{-7}$ or higher.

The high silica glasses of Tables I and II are viscous and have a high softening point which interferes with their use alone as vitrified bonds for diamonds in a grinding wheel but, by combining them with the frits of Tables III and IV, the fluidity, expansivity and other properties may be adjusted and adapted to make a superior bond. For example, the amount of the high fusing glass should be enough to prevent objectionable shrinkage, distortion and slumping in the fired rim, and for these reasons the high silica glass should be within the range limits given below. The core may be weaker bonded, and a larger proportion of the high silica glass is permissible. As indicated in Table II, the high silica glasses differ materially and thus give an opportunity to vary the wheel composition. Glass A is more fusible and tends to wet the grains better than glass B, while glass B has a very low expansivity. Hence, if desired, the two high silica glasses given may be mixed to give desired properties, and these are then further mixed with a selected low silica glass or frit.

It is preferred that the mixture of the two types of glasses contain between 10% and 90% by weight of the high silica glass. This mixture may be used in the vitrified bonded abrasive portion. It may also be used in the supporting back or center.

I prefer that the volume structure of the final product be such that the abrasive portion of the product contain between 2% and 80% by volume of the high silica glass. Both the diamond rim and the supporting core may also contain, in addition to the mixture of glasses, plastic clay and other ingredients desired for a particular wheel structure, but the vitrified bond for the diamond abrasive should ordinarily be derived chiefly from the glasses which, in the absence of other fluxing ingredients, may constitute 50% by weight or more of the non-diamond ingredients used.

The diamond or other abrasive grains may constitute from 2% to 60% by volume of the bonded mass.

Various types of composite two-zone diamond grinding wheels may be made of the above materials used in the specified proportions. The following Table V gives for two specific examples the proportions in grams of the ingredients. The frit used in each body is that of frit C in Table IV. The high silica borosilicate glass is glass A of Table II.

TABLE V

| Material | Diamond abrasive annulus | | Non-diamond supporting core |
|---|---|---|---|
| | Body E | Body F | |
| | Grams | Grams | Grams |
| Diamond grains, approximately 100 grit | 5.308 | 5.308 | |
| High silica borosilicate glass powder | 3.403 | 2.232 | 34.7 |
| Low silica borosilicate glass powder | 3.133 | 2.987 | 46.6 |
| Ball clay | 1.044 | .996 | 25.1 |
| Vitreous silica powder | | 1.331 | 67.8 |
| Silicon powder | .726 | .726 | 129.5 |
| Aluminum powder | .084 | .080 | 1.4 |
| 4% aqueous solution of methyl ether of cellulose | .877 | .874 | 19.5 |

As other examples of the composition for the diamond abrasive portion of a two-zone diamond grinding wheel, the ingredients may be used in the proportions given in the following table:

TABLE VI

| | Body G | Body H |
|---|---|---|
| Diamonds grams | 58.4 | 58.3 |
| High silica glass do | 44.9 | 29.9 |
| Low silica glass do | 28.7 | 43.4 |
| Ball clay do | 9.6 | 14.5 |
| Aluminum powder do | 0.8 | 4.3 |
| Silicon powder do | 8.0 | |
| 4% aqueous solution of methyl ether of cellulose grams | 9.62 | 9.63 |
| Weight per cent of high silica glass in the mixture of high silica glass plus low silica glass | 61 | 41 |
| Maturing temperature °C | 940 | 940 |

While various types of clay may be used, I have used in Tables V and VI a plastic ball clay having approximately the following analytical composition:

TABLE VII

| | Percent by weight |
|---|---|
| $SiO_2$ | 66.1 |
| $Al_2O_3$ | 21.3 |
| $Fe_2O_3$ | 1.0 |
| MgO | 0.1 |
| $Na_2O$ | 0.2 |
| $K_2O$ | 0.6 |
| $H_2O$ | 1.0 |
| $TiO_2$ | 2.6 |
| Loss | 7.4 |

In accordance with the data of Tables V and VI, the specified quantity of diamond grains may be vitrified bonded in the outer annulus by a glassy bonding phase derived principally from a mixture of the high silica borosilicate glass and the low silica borosilicate glass. The supporting core contains no diamond grains, and it may comprise a relatively smaller proportion of the mixture of these two glasses, together with a plastic clay and a suitable amount of a vitreous silica powder which, from one point of view, may be considered as being a low shrinking material taking the place of the diamond grains of the outer zone. The proportions of the specified ingredients provide substantially equal expansivities for the two zones and so prevent warping or cracking of the wheel during the firing and cooling operations. While the plastic clay may be omitted from the compositions of both zones or replaced by other substances, I have shown in the above Table V the use of relatively small amounts of clay in the diamond zone and a comparatively large proportion in the central supporting core. This ball clay serves to render the green mass plastic and moldable, and it lowers the expansivity due to its high silica content. It may also augment the glassy bonding phase.

The granular or pulverulent refractory material, such as the vitreous silica powder of Table V, aids in forming a structural framework for the vitrified mass. This material also may react with or become dissolved in the glassy bonding phase to a certain degree and thus augment that phase of the body. The metals of the table serve as protective agents, whose function primarily is to combine with oxidizing gases which are entrapped by or evolved from the ingredients during the firing operation, so as to prevent swelling of the article, even though the wheel be burned in a non-oxidizing atmosphere. That is, the silicon or aluminum powder has the capacity of uniting preferentially with oxygen and oxidizing gases to prevent them from causing swelling. The aluminum and silicon powders are particularly useful in a diamond wheel which requires as high as 50 to 60% by volume of a glassy bonding phase. Although the metal powder may be omitted for certain types of abrasive articles, I preferably employ the silicon and/or aluminum powder and/or reduced boron compounds as described in the patent to Milligan and Lombard, No. 2,132,005 of October 4, 1938. The proportions set forth in Table V will serve to minimize the danger of swelling of the article during the firing thereof. The proportion of the silicon powder may be comparatively high in the inner zone, since unoxidized silicon grains serve as non-shrinking structural particles which are bonded by the glassy phase of the bond.

The first step in making the grinding wheel is to make or procure powdered glasses and frits of the two types of composition specified in which complete fusion and reaction of the ingredients has been substantially attained. The specified mixtures of these borosilicate glasses and frits should be soft enough for bonding abrasive grains at a firing temperature of about 1000° C. or below. The silicon and aluminum powders are preferably in small sizes, such as that of the grains or smaller, and the clay is added as a powdered ingredient. These dry materials may be suitably mixed with each other and a small amount of a solution formed of methyl ether of cellulose. The latter acts as a wettant and temporary binder, and contributes to the plasticity and moldability of the mixture. Other suitable adhesives may be used.

The ingredients for the central supporting core are likewise compounded and definite weights of the two masses placed in a two-zone mold and suitably pressed and shaped under a high pressure, such as 2 to 20 tons and preferably over 10 tons per square inch. After drying the shaped article is fired in a kiln or furnace at a temperature of about 1000° C. or below for a sufficient period of time, such as three to five hours, which will insure that the bonding ingredients have fused, co-mingled and flowed into adhesive contact with the abrasive grains, and the bonds of the two zones have united integrally at their common junction. With diamonds or other readily oxidizable abrasives in the mixture, the firing should be carried out in nitrogen, carbon monoxide or other non-oxidizing atmosphere. Then the mass may be slowly cooled. I may utilize the methods and mold apparatus set forth in my copending application Serial No. 392,829 filed May 10, 1941 for making a ceramic bonded diamond wheel.

It will now be understood that there is a material advantage in employing the two or more types of glasses as a principal source of the vitreous bonding phase, rather than a single glass. Certain borosilicate glasses of the types specified are commercially available for use, and these may be used in widely different proportions to give series of bonds which have many different functions and uses. It is very convenient, practicable and economical to make these mixtures of glasses having different desired properties.

The glass B of Table II consisting of 94.5% of silica and having the remainder composed chiefly of boric oxide is a somewhat extreme type of borosilicate glass and it cannot serve alone as a low temperature vitrified bond. Its use with the frits of Table III, however, permits a wide range of variation of fluidity and expansivity of the glassy bonding phase. If the high silica glass is used in rather large proportions, such that all of it is not taken into solution by the low melting borosilicate glass or frit having the low silica content, the undissolved remainder functions as a granular or pulverulent structural element in either the abrasive annulus or the supporting core. Hence, a high silica content borosilicate glass of this type may be employed as a so-called "filler" material, for example, in place of the vitreous silica powder of Table V. But, since the borosilicate glass B containing a very high silica content is more fusible than is vitreous silica, the undissolved portion of that glass tends to form a firmer union with the other vitreous constituents of the wheel than would granular vitreous silica and, to the extent that it does so, it produces a stronger structural framework. I am thus enabled to provide an adequately fluid glassy bonding phase which yields a vitrified bonded diamond abrasive body of superior quality.

In a bond having undissolved glass of the high silica type, there are a plurality of glassy phases. One is the undissolved high melting high silica borosilicate glass, which has remained in its original condition because the low temperature firing conditions were insufficient to cause this glass to become fully fused. Another glassy phase comprises the low fusing, low silica borosilicate glass in which is dissolved such other constituents as are soluble and particularly some of the high silica glass.

It will now be appreciated by one skilled in the art that many other advantages are inherent in the above compositions and wheel structure. Also, it is to be understood that the above description of this invention is intended to illustrate the principles of my invention and to give the preferred compositions and formulae but it is not to be interpreted as imposing limitations on this invention except as are defined in the claims appended hereto.

I claim:

1. The method of making a vitrified-bonded abrasive article comprising the steps of making a mix of abrasive grains and a bond mixture of bond ingredients that include at least two powdered borosilicate glasses that constitute a substantial portion by weight of the bond mixture, one of said borosilicate glasses being a low fusing, low silica glass having a silica content, calculated as $SiO_2$, of between about 45% and 68% by weight and the other being a high fusing, high silica glass having a silica content, calculated as $SiO_2$, of between about 70% and 96% by weight, said mix containing a quantity of said low silica glass to provide, during subsequent firing of the mix, a fluid glassy matrix of low viscosity to wet the grains and containing the said high silica glass in a quantity to increase the viscosity, during said firing, of the bond mixture to thereby prevent deleterious shrinking and slumping, shaping the mix to the desired configuration, and firing the shaped mix to effect fusing of the said low silica glass ingredient to a fluidity to wet the abrasive grains of the mix and to effect partial fluidity of the high silica glass ingredient whereby the resultant low fluidity of said high silica glass increases the viscosity of the bond mixture and thereby prevents deleterious shrinking and slumping during maturing.

2. The method of making a vitrified-bonded diamond abrasive article of high bond content comprising the steps of making a mix of diamond abrasive grains and a bond mixture of bond ingredients that include at least two powdered borosilicate glasses that constitute at least 50% by weight of the bond ingredients, one of said borosilicate glasses being a low silica glass having a silica content, calculated as $SiO_2$, of between 45% and 68% by weight and below 1000° C. becoming fully fluid for bonding, and the other being a high silica glass having a silica content, calculated as $SiO_2$, of between 70% and 96% by weight and below 1000° C. not itself alone becoming fully fluid for good bonding, the said mix containing a quantity of said low silica glass to provide, during subsequent firing of the mix, a fluid glassy matrix of low viscosity to thereby effect wetting of the diamond grains and containing the said high silica glass in a quantity to increase the viscosity, during said firing, of the bond mixture to thereby prevent deleterious shrinking and slumping, developing plasticity in the said mix, shaping the mix to the desired configuration, and firing the shaped mix at a temperature that is at about or below 1000° C. and thereby producing a resultant mixture of glasses which has a viscosity that is greater than that of the low silica glass alone and preventing deleterious shrinking and slumping of the article during maturing of the bond, the particles of said high silica glass thereby becoming partially dissolved in and interfused with the glassy matrix of said low silica glass.

3. The method of making a vitrified-bonded diamond abrasive article of high bond content comprising the steps of making a mix of abrasive grains comprising diamonds and a bond mixture of bond ingredients in proportions such that the abrasive grains form from 2% to 60% by volume of the ultimate bonded article, said bond ingredients including at least 50% by weight of the bond ingredients, one of said borosilicate glasses being a low fusing silica glass having a low silica content, calculated as $SiO_2$, of between 45% and 68% by weight and becoming fully fluid for bonding at or below 1000° C., and the other being a high silica glass having a silica content, calculated as $SiO_2$, of between 70% and 96% by weight and a linear coefficient of expansion below $40 \times 10^{-7}$ and when below 1000° C. not itself becoming fully fluid for good bonding, said mix containing a quantity of said low silica glass to provide during subsequent firing of the mix a fluid glassy matrix of low viscosity to wet the grains and containing the said high silica glass in a quantity to increase the viscosity during said firing of the bond mixture to thereby prevent deleterious shrinking and slumping of the article and to give the matured bond an expansivity of substantially the same order of magnitude as that of the diamond abrasive grains, developing plasticity in the said mix, shaping the mix to the desired configuration, and firing the shaped mix under temperature conditions of between about 850° C. and about 1000° C. to effect fusing of the said low silica glass ingredient to a fluidity to wet the abrasive grains of the mix and to attain the desirable effect of said high silica glass for preventing deleterious shrinking and slumping of the article.

4. The method of making a vitrified-bonded abrasive article of high bond content comprising the steps of making a mix of abrasive grains comprising diamonds and a bond mixture of bond ingredients in proportions such that the abrasive grains constitute from 2% to 60% by volume of the ultimate abrasive article, said bond ingredients including at least two powdered borosilicate glasses that comprise at least 50% by weight of said bond mixture, one of said borosilicate glasses being a low silica glass which becomes fully fluid for bonding below 1000° C. and which has a composition, calculated by weight as oxides, of $SiO_2$ from 45% to 68%, of $B_2O_3$ from 20% to 40%, and of alkaline oxides from 3% to 10%, and the other being a high silica glass requiring a higher temperature than does said low silica glass for becoming fully fluid and having a linear coefficient of expansion below $40 \times 10^{-7}$ and a composition, calculated by weight as oxides, of $SiO_2$ from 70% to 96%, of $B_2O_3$ from 3.5% to 29.5%, and of alkaline oxides from 0.5% to 6.5%, said mix containing a quantity of said low silica glass to provide during subsequent firing of the mix a fluid glassy matrix of low viscosity to wet the abrasive grains and a quantity of said high silica glass on the order of from about 41% to about 61% by weight of the said glasses, developing plasticity in the said mix, shaping the mix to the desired configuration, and firing the shaped mix to mature the bond at a temperature that is sufficient to render said low silica glass fully fluid and below the temperature at which said high silica glass would itself alone become fully fluid for good bonding to wet the abrasive grains of the mix and the particles of the high silica glass to thereby cause the latter to increase the viscosity of the bond mixture to prevent deleterious shrinking and slumping the article and to effect interfusion of the particles of said high silica glass with the fluid glassy matrix.

5. In the method of making a multiple zone vitrified-bonded abrasive article that has an abrasive portion and a backing portion, the steps which comprise making up two mixes, one of which comprises abrasive grain and the other of which comprises granular material and both of which include a bond mixture of bond ingredients that comprise at least two powdered borosilicate glasses that constitute a substantial portion by weight of the bond mixture, one of said borosilicate glasses being a low fusing-point, low silica glass having a silica content, calculated as $SiO_2$, of between about 45% and 68% by weight and the other being a high fusing-point, high silica glass having a silica content, calculated as $SiO_2$, of between about 70% and 96% by weight, said mix containing a quantity of said low silica glass to provide, during subsequent firing of the mix, a fluid glassy matrix of low viscosity to wet the grains and containing the said high silica glass in a quantity to increase the viscosity, during said firing, of the bond mixture to thereby prevent deleterious shrinking and slumping of the article, developing plasticity in both of said mixes, shaping and assembling the two mixes to bring one into contact with the other, and firing the assembled mixes to form a body, made unitary by the resultant matured bond, at a temperature that is at or above the fusing point of said low silica glass and below the temperature at which said high silica glass itself alone would become fully fluid for good bonding to thereby effect fusing of the low silica glass ingredient in each shaped mix to a fluidity to wet the respective granular materials of said assembled mixes and whereby the resultant low fluidity of said high silica glass increases the viscosity of the bond mixture and thereby prevents deleterious shrinking and slumping during maturing of the article.

6. An abrasive article comprising abrasive grains bonded chiefly by a bond containing a plurality of intimately intermingled borosilicate glassy phases, one being a glassy matrix wetting and bonding the abrasive grains and having undissolved particles of the other phase interspersed therein, said interspersed phase being formed of a high silica borosilicate glass having a silica content, calculated as $SiO_2$, of between about 70% and 96% by weight, said matrix comprising a solution of a quantity of said high silica glass in a low fusing, low silica borosilicate glass having a silica content, calculated as $SiO_2$, of between about 45% and 68% by weight, and said bond being substantially free from detrimental shrinkage and slumping.

7. An abrasive article comprising abrasive grains bonded chiefly by a bond, at least 50% by weight of which is composed of a plurality of intimately intermingled borosilicate glassy phases, one being a matrix having the other phase interspersed therein, the interspersed phase being undissolved particles of a high silica glass having a silica content, calculated as $SiO_2$, of from about 70% to 96% by weight, and the matrix comprising a solution of a quantity of said high silica glass in a low silica glass having a silica content, calculated as $SiO_2$, of from about 45% to 68% by weight, said low silica glass constituting from 10% to 90% by weight of the total content of glassy phases and the glassy matrix wetting and adhering to the abrasive grains and bonding the same.

8. A vitrified-bonded diamond abrasive article of low porosity comprising diamond grains constituting from 2% to 60% by volume of the article which are united by a vitrified bond comprising two borosilicate glassy phases, one of which consists of undissolved particles of a high silica borosilicate glass having a silica content, calculated as $SiO_2$, of between about 70% and 96% by weight and having a linear coefficient of expansion below $40 \times 10^{-7}$, and another of which consists of a matrix containing particles of the high silica glass interspersed therein and comprising a solution of said high silica glass in a low silica borosilicate glass having a silica content, calculated as $SiO_2$, of between 45% and 68% by weight, said matrix wetting said abrasive grains and bonding them together without detrimental crazing.

9. An abrasive article comprising diamond grains constituting from 2% to 60% by volume of the article and a vitrified bond, at least 50% by weight of which is composed of intimately associated borosilicate glassy phases, one being a high silica borosilicate glass having, when calculated by weight as oxides, from 70% to 96% of $SiO_2$, from 3.5% to 29.5% of $B_2O_3$, and from 0.5% to 6.5% of alkaline oxides, and another being a matrix wetting and bonding the grains formed of a solution of said high silica glass in a low silica borosilicate glass having, when calculated by weight as oxides, from 45% to 68% of $SiO_2$, from 20% to 40% of $B_2O_3$ and from 3% to 10% of alkaline oxides, said matrix constituting from 10% to 90% by weight of the total content of glassy phases and containing minute particles of the high silica glass interspersed therein and partially dissolved at their boundaries.

10. An abrasive article comprising abrasive grains including diamonds united by a bond, at least 50% by weight of which is formed of a plurality of intimately intermingled borosilicate glassy phases, one being formed of particles of a high silica glass having a silica content, calculated as $SiO_2$, of between 70 and 96% by weight and having a linear coefficient of expansion below $40 \times 10^{-7}$, and another being a matrix comprising said high silica glass dissolved in a low silica glass having a silica content, calculated as $SiO_2$, of between 45 and 68% by weight, the high silica glass constituting from about 41 to about 61% by weight of the total borosilicate content and being proportioned to provide a coefficient of expansion sufficiently close to that of diamond so that the bond adheres thereto without crazing materially, said matrix containing particles of the high silica glass interspersed therein and partially dissolved at the particle boundaries.

11. A vitrified-bonded diamond abrasive article having a unitary body comprising an abrasive portion throughout which are diamond abrasive grains and a backing portion throughout which are non-diamond grains, the grains of both portions being bonded, and the two portions being made unitary and integral throughout, by a vitrified bond comprising a plurality of borosilicate glassy phases, one of which consists of undissolved particles of a high silica borosilicate glass having a silica content, calculated as $SiO_2$, of between about 70% and 96% by weight and having a linear coefficient of expansion below $40 \times 10^{-7}$, and another phase of which is a matrix comprising a solution of particles of said high silica glass in a low silica borosilicate glass having a silica content, calculated as $SiO_2$, of from 45% to 68% by weight, said matrix wetting said grains and bonding them together into a unitary article without detrimental crazing or cracking, and the article being substantially free from detrimental shrinkage and slumping.

12. An abrasive article formed of a supporting portion comprising vitrified-bonded granules integrally united with an abrasive portion of vitrified-bonded abrasive granules, the granules of both being bonded chiefly by a bond comprising two intimately associated glassy phases, one being formed of particles of a high silica borosilicate glass having a silica content, calculated as $SiO_2$, of between 70% and 96% by weight, and another being a matrix comprising a solution of particles of said high silica glass in a low silica borosilicate glass having a silica content, calculated as $SiO_2$, of between 45% and 68% by weight, said bonded portions having similar thermal expansivities, and the matrix wetting and adhering to the granules and containing minute particles of the high silica glass interspersed therein and partially dissolved thereby.

ROBERT H. LOMBARD.

CERTIFICATE OF CORRECTION.

Patent No. 2,343,218. February 29, 1944.
ROBERT H. LOMBARD.

It is hereby certified that error appears in the printed specification of the above numbered patent requiring correction as follows: Page 2, first column, line 63, after "fluidity" strike out "stage" and insert the same after "second" in line 62; and that the said Letters Patent should be read with this correction therein that the same may conform to the record of the case in the Patent Office.

Signed and sealed this 9th day of May, A. D. 1944.

Leslie Frazer (Seal) Acting Commissioner of Patents.

both being bonded chiefly by a bond comprising two intimately associated glassy phases, one being formed of particles of a high silica borosilicate glass having a silica content, calculated as $SiO_2$, of between 70% and 96% by weight, and another being a matrix comprising a solution of particles of said high silica glass in a low silica borosilicate glass having a silica content, calculated as $SiO_2$, of between 45% and 68% by weight, said bonded portions having similar thermal expansivities, and the matrix wetting and adhering to the granules and containing minute particles of the high silica glass interspersed therein and partially dissolved thereby.

ROBERT H. LOMBARD.

CERTIFICATE OF CORRECTION.

Patent No. 2,343,218. February 29, 1944.

ROBERT H. LOMBARD.

It is hereby certified that error appears in the printed specification of the above numbered patent requiring correction as follows: Page 2, first column, line 63, after "fluidity" strike out "stage" and insert the same after "second" in line 62; and that the said Letters Patent should be read with this correction therein that the same may conform to the record of the case in the Patent Office.

Signed and sealed this 9th day of May, A. D. 1944.

Leslie Frazer (Seal) Acting Commissioner of Patents.